United States Patent [19]
Samuel et al.

[11] Patent Number: 6,023,729
[45] Date of Patent: *Feb. 8, 2000

[54] METHOD AND APPARATUS FOR MATCH MAKING

[75] Inventors: Daniel Joseph Samuel, Sunnyvale; Michael Andrew Wolf, Mountain View; Donald Peregrine Clark, Sunnyvale, all of Calif.

[73] Assignee: MPATH Interactive, Inc., Mountain View, Calif.

[*] Notice: This patent is subject to a terminal disclaimer.

[21] Appl. No.: 08/876,953

[22] Filed: Jun. 17, 1997

Related U.S. Application Data

[60] Provisional application No. 60/044,023, May 5, 1997.

[51] Int. Cl.$^7$ .................................................... G06F 15/16
[52] U.S. Cl. ...................... 709/228; 709/227; 709/204; 463/42
[58] Field of Search ........................... 395/200.3, 200.33, 395/200.34, 200.35, 200.36, 200.37, 200.5, 200.52, 200.53, 200.54, 200.55, 200.56, 200.57, 200.58, 200.68, 200.69, 200.74; 463/42; 709/200, 203, 204, 205, 206, 207, 220, 222, 223, 224, 225, 226, 227, 228, 238, 239, 244

[56] References Cited

U.S. PATENT DOCUMENTS

| | | | |
|---|---|---|---|
| 4,521,014 | 6/1985 | Sitrick | 273/1 GC |
| 4,570,930 | 2/1986 | Matheson | 273/1 E |
| 4,572,509 | 2/1986 | Sitrick | 273/85 G |
| 4,811,199 | 3/1989 | Kuechler et al. | 364/200 |
| 4,856,787 | 8/1989 | Itkis | 273/237 |
| 4,998,199 | 3/1991 | Tashiro et al. | 364/410 |
| 5,014,219 | 5/1991 | White | 364/513 |
| 5,021,943 | 6/1991 | Grimes | 364/200 |
| 5,083,271 | 1/1992 | Thacher et al. | 364/411 |
| 5,083,800 | 1/1992 | Lockton | 273/439 |

(List continued on next page.)

FOREIGN PATENT DOCUMENTS

| | | | |
|---|---|---|---|
| 0 481 770 A2 | 4/1992 | European Pat. Off. | G06F 1/00 |
| WO 93/23125 | 11/1993 | WIPO | A63F 9/22 |

OTHER PUBLICATIONS

Alden, D., "Multi–Player Games: A New Feature for BBS Fans", *LinkUp*, vol. 1, No. 8, May 1984, pp. 2 and 34–36.

"All of the software you need is downloadable from my Ifrag download area", from http://www.agnlianet.co.uk/home/lighter/ifrag.html, Date unknown, pp. 1–2. (As downloaded Sep. 8, 1998).

(List continued on next page.)

*Primary Examiner*—Frank J. Asta
*Assistant Examiner*—Marc D. Thompson
*Attorney, Agent, or Firm*—Sterne, Kessler, Goldstein & Fox, P.L.L.C.

[57] ABSTRACT

A method and apparatus related to grouping (or matching) network users and computers associated with multi-user applications is disclosed. Each user is associated with a client computer that is connected to a network. A match maker application resides on one or more server computer (s). The match maker application controls the process of collecting Clients into matched sets, called client groups, based upon a wide range of attributes of the users, their client computers, the server computers, software application titles, application instances and/or data communication links of the network, for example. Each time the match maker application creates a client group, it creates a group data set that represents the client group. Network match making information is presented to users in an understandable manner using icons, other graphical images or collections of icons and/or images, for example, displayed on a display screen. For example, a non-textual element of a graphical image can be varied to communicate group information about a client group to a user. A variety of non-textual elements can be used to communicate a variety of group information to a user.

42 Claims, 13 Drawing Sheets

U.S. PATENT DOCUMENTS

| | | | |
|---|---|---|---|
| 5,114,155 | 5/1992 | Tillery et al. | 273/371 |
| 5,187,790 | 2/1993 | East et al. | 395/725 |
| 5,324,035 | 6/1994 | Morris et al. | 273/138 A |
| 5,329,619 | 7/1994 | Pagè et al. | 395/200 |
| 5,341,477 | 8/1994 | Pitkin et al. | 395/200 |
| 5,350,176 | 9/1994 | Hochstein et al. | 273/148 B |
| 5,351,970 | 10/1994 | Fioretti | 273/439 |
| 5,359,510 | 10/1994 | Sabaliauskas | 364/410 |
| 5,367,635 | 11/1994 | Bauer et al. | 395/200 |
| 5,394,522 | 2/1995 | Sanchez-Frank et al. | 395/159 |
| 5,422,883 | 6/1995 | Hauris et al. | 370/62 |
| 5,426,427 | 6/1995 | Chinnock et al. | 340/827 |
| 5,442,749 | 8/1995 | Northcutt et al. | 395/200.09 |
| 5,459,837 | 10/1995 | Caccavale | 395/184.01 |
| 5,491,797 | 2/1996 | Thompson et al. | 395/200.03 |
| 5,497,491 | 3/1996 | Mitchell et al. | 395/700 |
| 5,513,126 | 4/1996 | Harkins et al. | 364/514 A |
| 5,517,622 | 5/1996 | Ivanoff et al. | 395/200.13 |
| 5,522,044 | 5/1996 | Pascucci et al. | 395/200.06 |
| 5,524,253 | 6/1996 | Pham et al. | 395/800 |
| 5,535,403 | 7/1996 | Li et al. | 395/800 |
| 5,547,202 | 8/1996 | Tsumura | 463/29 |
| 5,548,726 | 8/1996 | Pettus | 395/200.09 |
| 5,553,239 | 9/1996 | Heath et al. | 395/187.01 |
| 5,559,933 | 9/1996 | Boswell | 395/114 |
| 5,560,005 | 9/1996 | Hoover et al. | 395/600 |
| 5,560,008 | 9/1996 | Johnson et al. | 395/650 |
| 5,572,582 | 11/1996 | Riddle | 379/202 |
| 5,580,309 | 12/1996 | Piechowiak et al. | 463/16 |
| 5,586,257 | 12/1996 | Perlman | 463/42 |
| 5,586,937 | 12/1996 | Menashe | 463/41 |
| 5,590,360 | 12/1996 | Edwards | 395/800 |
| 5,593,349 | 1/1997 | Miguel et al. | 463/30 |
| 5,594,910 | 1/1997 | Filepp et al. | 395/800 |
| 5,600,833 | 2/1997 | Senn et al. | 395/601 |
| 5,608,426 | 3/1997 | Hester | 395/200.35 |
| 5,695,400 | 12/1997 | Fennell, Jr. et al. | 463/42 |
| 5,787,250 | 7/1998 | Badovinatz et al. | 395/200.31 |
| 5,793,365 | 8/1998 | Tang et al. | 345/329 |
| 5,793,962 | 8/1998 | Badovinatz et al. | 395/200.31 |
| 5,794,178 | 8/1998 | Caid et al. | 704/9 |
| 5,795,228 | 8/1998 | Trumbull et al. | 463/42 |
| 5,796,395 | 8/1998 | De Hond | 345/334 |
| 5,805,830 | 9/1998 | Reese et al. | 395/200.35 |
| 5,828,843 | 10/1998 | Grimm et al. | 395/200.58 |
| 5,832,229 | 11/1998 | Tomoda et al. | 395/200.57 |
| 5,894,556 | 4/1999 | Grimm et al. | 395/200.57 |

OTHER PUBLICATIONS

"AT&T's VoiceSpan: A New Edge For Gaming . . . And More" and "PF. Magic + AT&T + Sega = Edge 16", *Release 1.0*, Esther Dyson's Monthly Report, Apr. 18, 1994, pp. 4–7.

Coleman, Scott, "Internet Frag Tracker Frequently Asked Questions List", Internet newsgroup posting (Apr. 23, 1995), pp. 1–3, Available at www.dejanews.com.

Coleman, S. and J. Cotton, "The TCP/IP Internet DOOM FAQ", from http://www.gamers.org/dhs/helpdocs/inet-doom.html, Jan. 11, 1995, pp. 1–10, (as downloaded Aug. 11, 1998).

Cotton, J., "History of Kali and iFrag", from http://www-.las.es/kali/history.html, Dec. 28, 1995, pp. 1–3, (as downloaded Aug. 11, 1998).

Cotton, J. and S. Coleman, "The TCP/IP Internet Gamer's FAQ,", Internet newsgroup posting (May 24, 1995), pp. 1–9, Available at *www.dejanews.com*.

Cronin, D., "MUD Games on the Internet", *Dr. Dobb's Information Highway Sourcebook*, Winter 1994, pp. 22–25.

Fitzgibbons, P., "Telegaming: A Survey of On–Line Gaming Opportunities", *Softalk*, vol. 2, Mar. 1984, Cover sheet plus 4 pages beginning at p. 89.

Fowler, D., "Treading the Boards", *Computer Shopper*, Aug. 1994, pp. 612–613.

"Game Connection Pro", URL:http:www.siriussoft.com/Gameinfo.htm, Date Unknown (Downloaded Jan. 22, 1998), 4 pages.

Habig, Alec, "Re: Normal Lag?!?", Internet newsgroup posting (Jun. 22, 1995), pp. 1–2, Available at www.dejanews.com.

"Here is how to set up an ethernet card for Ifrag", from http://www.anglianet.co.uk/home/lighter/ethernet.html , Date unknown, pp. 1–9, (as downloaded Aug. 11, 1998).

"Here I will go over the setup of slippr15 and Ifrag for a modem", from http://www.anglianet.co.uk/home/lighter/slip.html, Date unknown, pp. 1–9, (as downloaded Aug. 11, 1998).

James, R. and L. Sphinx, "Creating Your Own Multiplayer Game Systems", *Dr. Dobb's Information Highway Sourcebook*, Winter 1994, pp. 56–64.

"Kali: IPX across the net", URL:http://worldvillage.com/wv/gamezone/html/feature/mayhem/mayhem2.htm, Downloaded Jan. 22, 1998, (4 pages).

Keizer, G., "Dial–a–Duel", *Computer Shopper*, Jun. 1993, pp. 606–608.

Keizer, G., "Playing the Field: Online gaming matches your wits against real opponents", *OMNI*, Mar. 16, 1993, p. 18.

Kennedy, Ben, "Tikkiman's Guide to Ifrag", from http://www.students.haverford.edu/bkennedy/html/ifrag.htm, Apr. 20, 1996, pp. 1–8, (as downloaded Aug. 11, 1998).

"Kesmai Launches Aries '96" and other links from https://www.gamestorm.com , Downloaded Feb. 11, 1998, (29 pages).

Levinson, Aaron, "Re: New Internet Doomer. Help!", Internet newsgroup posting (Aug. 23, 1995), pp. 1–2, Available at www.dejanews.com.

"MGYP", URL:http://www/azstarnet.com/~ruc/yellow/prime.htm, Downloaded Jan. 22, 1998, (2 pages).

"Modem Combat", *Compute*, Sep. 1994, Cover sheet plus 4 pages beginning at p. 86.

"Multiplayer Dot Com (Multiplayer Gaming Networks)", URL:http://www.multiplayer.com/networks.html, Copyright 1996, 1997, Downloaded Jan. 22, 1998, 8 pages.

"Multiplayer Internet Gaming" and other links from http://www.teleport.com, Downloaded Jan. 22, 1998, (26 pages).

"Multiplayer Game", URL:http://www.lycos.com/wguide/wire/wire_867716_49646_2_0.html, Jan. 21, 1998, (2 pages).

"Multiplayer Games with Graphical Interface", *Newmedia*, Nov. 1994, Cover sheet plus 2 pages including p. 63.

"Multiplayer Dot Com (Tools)" URL:http://www.multiplayer.com/tools.html, Copyright 1996, 1997, Downloaded Jan. 22, 1998, 2 pages.

"Multiplayer Database FAQ", URL:http://www.crazyfox-.com/multiplayer/faq.shtml, Downloaded Jan. 22, 1998, (2 pages).

"On line gaming", URL:http://www.geocities.com/ResearchTriangle/5431/online.html, (May 27, 1996), Downloaded Jan. 22, 1998, (3 pages).

"Online game sites compete for fans" and other links from http://www.dwango.com, Copyright 1997, Downloaded Jan. 22, 1998, (8 pages).

"Online Gaming", *PCGamer*, vol. 3, No. 5, May 1996, pp. 70 and 72.

Peterson, L.L., "A Yellow–Pages Service for a Local–Area Network", *Computer Communication Review (ACM Press Proceedings)*, Aug. 11–13, 1988, pp. 235–242.

"Recreation:Games:Internet Games: Interactive Web Games:Multi–User Games", URL:http://www.yahoo.com/Recreation/Games/Internet_Games/Interactive_Web_Games/Multi_. Downloaded Jan. 22, 1998, (2 pages).

"Release 1.0", Esther Dyson's Monthly Report, Jun. 27, 1994, pp. 1–18.

Silverman, D., "Cyberspace arcade links 'Doom' fans", *Houston Chronicle*, Sep. 28, 1994, (2 pages).

Silverthorne, S., "Doom", *PCWeek*, vol. 11, No. 43, Oct. 31, 1994, pp. A/1, A/10 and A/12.

Spear, P., "The Online Games People Play", *Compute*, Nov. 1991, Cover sheet plus 3 pages beginning at p. 96.

"The Internet Gaming Zone", URL:http://www.zone.com/zonepromo/gamelist.asp. Downloaded Jan. 22, 1998, (2 pages).

"Zarf's List of Interative Games on the Web", URL:http://www.leftfoot.com/games/html, Downloaded Jan. 22, 1998, (3 pages).

વ6,023,729

METHOD AND APPARATUS FOR MATCH MAKING

This application claims the benefit of U.S. Provisional application No. 60/044,023 entitled Method and Apparatus for Match Making, filed on May 5, 1997 having inventors Daniel J. Samuel, Michael A. Wolf, Donald P. Clarke.

BACKGROUND

1. Copyright Authorization

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

2. Field of the Invention

The invention relates generally to computer networks, and more particularly to methods and apparatus for grouping (or matching) network users, client computers and/or client software, for example, based upon values of attributes associated with such users, client computers and/or client software.

3. Background

Data communications networks are widely used to connect multiple computers together for communicating and sharing information.

Data communications networks can also be used to implement multi-user applications that allow multiple persons (herein users) to share in the operation of a computerized application. Such computerized applications are known as multi-user applications. The software used to implement computerized applications is known herein as application software or simply application or applications.

An instance of an application refers to a single copy of application software which is loaded into computer memory and then started executing instructions. If a further copy of the same application software is loaded into the memory of the same computer or some other computer, and it starts executing instructions then that constitutes a further instance of the application, even though there may be as few as one computer involved.

Multi-user applications can have many requirements as to how the various users relate to one another.

One particular type of multi-user application is a traditional electronic data processing (EDP) centralized system, such as a complex airline reservation system implemented on a group of mainframe computers and in this case each user essentially has a relationship with the system. In such a system the users don't really have much of a mutual relationship and may only rarely even become aware of one another. Thus such a system might afford different capabilities to each of airline check-in clerks, travel agents and auditors. Such users share datasets so that one user is to some extent affected by the action of another user, for example several travel agents might all be attempting to sell the one last seat available on a particular night. Such systems are known to the person having ordinary skill in the art.

Other types of multi-user applications may cause a user to have more consciousness of other user(s) and a stronger mutual relationship. This may come about incidentally, as say two geographically separated people try to simultaneously revise the same electronic document, in which case they need to become aware of each other and some form of arbitration or cooperation is needed. Alternatively the users may join in the application for the prime purpose of sharing and exchanging data. An example of this latter application would be a two (or more) party video conference with shared electronic blackboard using personal computers.

A further type of application is a form of single instance, shared resource application such as the so-called "chat rooms" found on commercial data services such as the famous CompuServe (R) service. In this latter type of multi-user application the users typically locate the shareable resource and then join (or "attach to") the instance of the application that handles the resource. Again the system may provide facilities for the use of the resource that vary from user to user.

A still further type of multi-user application, is the kind where a multiplicity of users join into a multiplicity of application instances. This genre of applications is known herein as an Online Multi-User, Multiply-Instanced Application (an OMM in the absence of any standard or popular industry accepted terminology). Typical examples of OMMs are online multi-player games which allow multiple users to share in a game with one another. These types of applications are found, for example, in the ImagiNation (TM) Network. IMAGINATION! Premier On-Line Entertainment Network—Welcome, Published 1994 by "The Imagination Network", Part Number DO-INN-CD-23. They can also be found at the MPG-NET (TM). MPG-NET Access Numbers, Published 1993 by MPG-NET, Inc.

To facilitate OMMs, a service or facility is needed to match users to specific instances of the applications. This service or facility is called a match making service (or network match making facility). When automated and implemented as one or more computer Server programs, each collection of those programs can be called a match maker application, a MatchMaker, a match maker or a network match maker. These terms are used interchangeably.

The manner in which conventional match maker applications provide information to users could be more understandable and/or intuitive. In addition, the manner in which conventional match maker applications process information related to users, client applications, and/or client computers could be handled more effectively.

SUMMARY

A match maker application is used to create matched sets of users of a multi-user application. Each user is associated with a client computer connected to a network, therefore matched sets of users are analogous to matched sets of client computers inasmuch as clients computers and users are typically in a one to one relationship.

The match maker application resides on a server computer or sometimes on several server computers on the network. The match maker application communicates, by way of messages, with cooperating client applications (Clients) which reside on each client computer. Ordinarily users and Clients are in a one to one relationship and the embodiment of the invention matches Clients as a means of matching users.

The term software application title (or title for short) refers to an installable software application product, whereas the term application instance refers to a single executable copy of the corresponding title where that copy has been loaded into computer memory and has started executing instructions. In some multi-user applications, one or more server computers on the network are also used for supporting an on-line multi-user multiply-instanced application (OMM). The match maker application controls the process of collecting the Clients (each of which typically is associated with a user) into matched sets based on a wide range of attributes of the users, their client computers, the server computers, the software application titles and application instances and of the attributes of the various data communications links between the client computers and server computers.

An embodiment of the invention provides a clear way to present to users network match making information to assist those users in choosing an instance of a multi-user networked application where multiple instances of such applications are simultaneous available (OMMs).

Similarly, an embodiment of the invention also provides a clear way to present to users network match making information to assist such users in selecting other users to join with them in an OMM instance.

An embodiment of the invention further provides a systemic way of organizing and presenting multiple offers, where such offers are offers to create an OMM instance, and to assist such users in selecting an offer to accept. Such a way of organizing and presenting includes complex attributes pertinent to the process of match making of networked applications; those attributes include, inter alia, properties of client and server computers and the network links between them.

In order to fullfil its purposes, an embodiment of the invention uses a match maker application to organize Clients into groups termed client groups.

The match maker application creates and maintains group datasets which comprise the values of attributes associated with each Client where the Client belongs to a corresponding client group. Some client groups may consist of only a single Client.

Client groups are created in response to the match maker application's determination that all Clients within the group share some common or otherwise related attribute. For example it may be they all desire the same software application title, or they are have common privilege levels or there is some commonality about the performance of their network links. Each time the match maker application creates a client group, it also creates a group dataset representing that client group.

This type of organization allows the maintenance of information in both hierarchical and mesh structures, by permitting the group datasets for each client group to contain references to any other group datasets that represent client groups that share a Client in common.

Presentation to the user of the values of attributes contained in group datasets is typically by icons or other graphical images displayed on a computer display screen and/or by collections of images within a window on a video display screen. Other types of image presentation devices can be used, however. Each client group may be in any of many conditions depending upon the values of a variety of attributes and the number of the clients of various types that are members of the group. Such conditions are encoded in group datasets that each represent a client group as the values of attributes.

The appearance to each user of a non-textual element of a graphical image (such as an icon or other type of image) is varied depending upon the contents of the group dataset for the client group that it represents. The client computer that displays the graphical image or images communicates dynamically with the match maker application to keep both mutually informed of the conditions of the client groups so that the client computer can properly display the correct image representations.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION

Embodiments of the invention provide novel apparatus and methods related to grouping network users, client applications and/or client computers, for example. The following description is presented to enable a person skilled in the art to make and use the invention. Descriptions of specific embodiments are provided only as examples. Various modifications to the described embodiments may be apparent to those skilled in the art, and the generic principles defined herein may be applied to other embodiments and applications without departing from the spirit and scope of the invention. Thus, the present invention is not intended to be limited to the described or illustrated embodiments, but is to be accorded the widest scope consistent with the principles and features disclosed herein. Though much of the discussion herein is directed to the use of online multi-user games programs, and indeed such games are expected to be one use of embodiments of the invention, it should be understood that online games are disclosed by way of an example and the embodiments of the invention can be implemented more generally.

Figure 18:
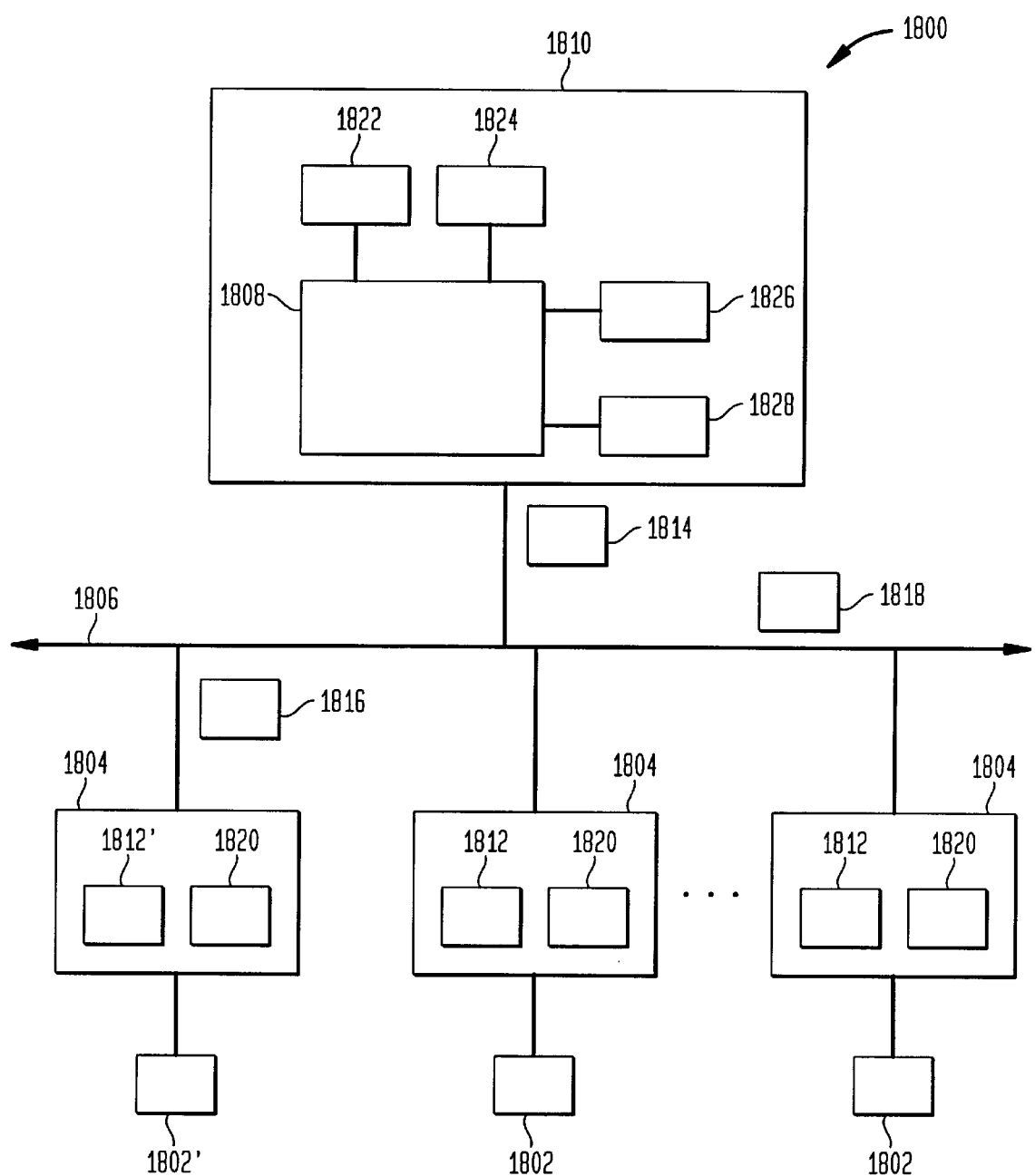
FIG. 18 illustrates a network with which an embodiment of the invention may be used.

In an embodiment of the invention, a match maker application is used to create matched sets of users of an OMM. This embodiment may be used in a network such as the network 1800 illustrated in FIG. 18. In that figure, the match maker application 1808 resides on a server computer 1810 or sometimes on several server computers on the network 1806. The match maker application 1808 typically communicates by way of messages (e.g. messages 1814, 1816, and 1818) with cooperating client applications 1812 (Clients) which reside on each client computer 1804. The client applications cooperate with the match maker application 1808 and with each other by exchanging such messages. The client computers 1804 include video displays 1820. One example of a match maker application is disclosed in U.S. Pat. No. 5,828,843 issued to Grimm et al. This entire application is hereby incorporated herein by this reference. As shown in FIG. 18, each user 1802 is associated with a respective client computer 1804 that is connected to a network 1806. Therefore, in the present embodiment matched sets of users are analogous to matched sets of client computers inasmuch as clients computers and users are in a one to one relationship. Ordinarily users and Client applications are in a one to one relationship and the present embodiment of the invention matches Client applications as a means of matching users. It will be appreciated that the number of users that are connected to a network and that are using a match maker application may vary widely.

The term software application title herein refers to an installable software application product, whereas the term application instance refers to a single executable copy of the corresponding title where that copy has been loaded into computer memory and has started executing instructions. In some multi-user applications, one or more server computers on the network are also used for supporting an on-line multi-user multiply-instanced application (OMM). The match maker application controls the process of collecting the Client applications (each of which is associated with a user) into matched sets based on a wide range of attributes associated with the users, their client computers, the server computers, the software application titles and application instances. The match maker application also considers attributes associated with the various data communications links between the client computers and server computers. In the particular embodiments described below the software application is a game program. In that context, the software application title is typically referred to as a game title.

The present embodiment of the invention displays upon a user 1802's video screen 1820 images that represent information that is maintained by the match maker application 1808. The match maker application maintains information on instances of OMMs, of offers to create instances of OMMs and of groups of Clients, for example. The present embodiment provides facilities whereby the human users are able, clearly and easily, to steer the action of the match maker application 1808 and the cooperating client applications 1812 as a means by which the user 1802 can tailor the matching of the sets of users. Sets of users are matched to instances of OMMs and to offers to create instances of OMMs Match makers, such as the one disclosed in U.S. Pat. No. 5,828,843 issued to Grimm et al. are able to form user matches and application instance matches taking into account various sets of attributes such as client, users, application, server and communications attributes. Moreover such match makers can deal with match offers for automatic matches, user created match offers, Peer to Peer games, Client-Server games using a single Game Server, Client-Server games using multiple game Servers and ancillary related (sometimes called "add-on") features such as digitized speech data broadcast servers for use during gameplay. In the present embodiment, the term match option includes any one of:

1. a match offer (sometimes called a user match offer or user created match offer)

2. an automatic offer (sometimes called an automatic match or automatic match offer) or 3. an executing application instance (often used to refer to a game program instance wherein it is possible for a further player to join the game).

Each of these terms can be used in the context of games, but each is not limited to that context. In alternate embodiments, a match option may refer to other types of matching options appropriate to the particular multi-user application.

The present embodiment of the invention presumes the existence of a match maker application with general functions. For example, the specific implementation of the match maker need not be that disclosed in U.S. Pat. No. 5,828,843 issued to Grimm et al. but the match maker application often will provide a meaningful subset of the features described therein.

The information communicated between the match maker application 1808 and the cooperating client application (Client) 1812 is specific to each Client. The nature of this information is further discussed below, however it is useful at this juncture to note that such information defines, inter alia, the ability of the Client 1812 (in the light of the prevailing circumstances) to join:

a specific running OMM instance or an offer to create a running OMM instance.

Additionally the information defines the current ability of the Client 1812 to create an offer to create a running OMM instance.

In order to fulfill its purposes, the match maker application 1808 organizes the Client applications 1812 into groups termed client groups. The match maker application creates and maintains group datasets. The term group dataset is used herein to refer to a set of information which comprises the values of attributes associated with a Client application belonging to a client group.

Some client groups may consist of only a single Client. Client groups are created in response to the match maker application's determination that a set or subset of Client applications share at least one common or otherwise related attribute value or range of values. For example it may be that a number of client applications all desire to use the same game title, or they all have common privilege levels or their is some commonality about the performance of their network links. Each time the match maker application creates a client group it also creates a group dataset that represents that client group.

Group datasets generated by the match maker application comprise the values of many attributes such as (for example) attributes of:

the users (e.g. gender=male/female, age=<age>, skill level=novice/intermediate/expert, subscription type=based/enhanced/premier), their client computers (e.g. type=PC, sound system=mono/stereo), any servers required by each instance of the relevant OMM (e.g. server=<particular server to be used with a particular instance>), the application titles desired by each Client (e.g. game title=Monsters from Mars), the application instances desired by each Client (e.g. game instance=Jimmy's game/game 57/quarter finals/<name of the particular game instance>), the attributes of the various data communications links between the client computers and server computers (e.g. latency=<latency>, throughput=<throughput>, error rate=<error rate>.

The nature of many attributes and their use in match makers are discussed U.S. Pat. No. 5,828,843 issued to Grimm et al. In addition, when a group dataset represents at least one common Client with other group datasets, then mutual cross references (or in some cases one-way references) may be maintained as part of each group dataset that references the common Client. Moreover each relationship may be mesh or hierarchical (and if hierarchical there is definition as to which group dataset is the higher (or denser) ranking and which therefore the lower (or sparser)). The choice of relationship is established by the match maker application according to predefined criteria, as discussed below.

Amongst the Client attributes are those which may be characterized as states (client states). These states are attributes for which the possible values are known enumerations. An example might be an attribute called game progress which could take any one of three values (or states) where the possible values are Unstarted, Running and Finished. In consequence, each state may be represented by an integer, typically a small non-negative integer. Other, more general types of attributes may need to be represented by real or complex numbers, string values and so on. Sometimes states may be viewed differently by a Client depending on the state of the Client requesting a view. That is to say, a view of a state may be requested and generated that is dependent upon both the requester's state and the subject Client state.

As an example of how Client states and other attributes may be used to present varying helpful images on a user's video screen in a practical OMM based system, consider on-line multi-player gaming with a match maker application devised for that purpose:

Initially a Client 1812 attaches to the match maker application 1808 by means of exchanges of data messages. In response, the match maker application 1808 creates a new client group and corresponding new group dataset for each newly attached Client. For example, the match maker application 1808 may create a dataset 1822 to represent one attached Client application and another dataset 1824 to represent another attached Client application.

The match maker 1808 also maintains a client group (and corresponding group dataset) for each game title selected by one or more Client applications. At this point, however, the newly attached Client 1812 has not yet selected a game title. Any group dataset created solely or primarily because two client groups have selected the same game title is termed a game title related group dataset. Game title related group datasets contain a hierarchical reference with the datasets that represent the client group that has selected the game title. For example, the game title related group dataset is higher in rank than the group dataset that represents the client group that includes the Client that has selected the particular game title. This relationship reflects the simple notion that after a Client selects a game title, then in some sense the Client "belongs" to that game title. A game title can "own" many Client applications.

Next the match maker application 1808 communicates an encoded version of all of the value of the attributes of each of the available game application titles to the Client 1812 that selected the subject game title using a message. Such attributes are discussed in U.S. Pat. No. 5,828,843 issued to Grimm et al. Receipt of the message by the Client application 1812' enables the Client to display on video display 1820' to the user 1802' an image representing each and every game title that is available to that user.

The user selects a desired game title from the corresponding images presented to him. Since the images form part of a graphical user interface, an old stimulus technique such as a computer mouse click may be used as a means of selecting the title. Next the Client 1812' notifies (by means of a data message) the match maker application 1808 of a game title selected.

At this point the values of attributes of that Client 1812' are added to the appropriate group dataset that represents the game title (also termed "game title related group dataset"). Dataset 1826 illustrates an example of a game title related group dataset that represents a particular game title. One of the attributes maintained as part of the game title related group dataset is the number of users (user count) that have selected the title.

An encoded version of all of the values of attributes contained in the relevant game title related group dataset 1826 is transmitted from the match maker application 1808 to the Client 1812' that selected the application. Moreover the values of attributes contained in the group dataset for each client group that is referenced in the game title related group dataset (e.g. other Clients that have also selected that game title) are also transmitted from the match maker application 1808 to the Client 1812'. It can be seen therefore that an encoded version of the values of attributes in a dataset that represents each Client 1812 that has selected the subject game title is transmitted.

Next the Client 1812' graphically displays an image for each group dataset received. This allows a graphical display of the values of the attributes of each of the other Client, and therefore of each of the other users that have selected the same desired game title (since users attributes are a part of Client attributes).

In a similar manner to the selection of a game title the user 1802' may select the image that maps to a particular other user of interest so that, again in a similar manner, the match making application 1808 can send further (and more detailed) group datasets so that images may be displayed that further inform the user 1802' about the attributes of the other user(s) selected.

The user 1802' may also stimulate the Client 1812 to send a message to the match maker application 1808 to request the match maker application to create an offer to create a game instance. Such an offer is a game offer.

The match maker 1808 also maintains client groups associated with each game offer. These client groups (and corresponding group datasets) are created whenever a request to create a game offer is received by the match maker application 1808. The group datasets that represent such client groups related to game offers may comprise, for example, the contents of the group datasets of the Client 1812 that created the game offer and of the Clients 1812 that accepted the game offer. The group dataset may also include the values of game attributes such as the game scenario selected (scenarios are a gaming feature for example representing a particular road circuit in a motorcycle racing game), maximum and minimum numbers of players, data communications attributes of the Clients and other attributes as described in U.S. Pat. No. 5,828,843 issued to Grimm et al. Dataset 1828 illustrates a dataset representing a game offer.

At some point match maker application 1808 converts a game offer client group into a game instance client group. This conversion occurs when the match maker application 1808 creates a game instance at the request of a Client 1812. This conversion process is termed launching the game. When the game is launched, the game offer dataset 1828 is converted into a game instance dataset. The match maker application 1808 may simultaneously handle numerous client group datasets, game offer datasets and game instance datasets. Multiple simultaneous game offer datasets may exist for each game title. Multiple simultaneous game instance datasets may exist for each game title. Multiple game title datasets may be handled simultaneously.

An attribute of a group dataset that represents a game offer or game instance is the game progress state. The value of the game progress state attribute indicates
1. Whether the game has not yet been launched
2. Whether the game is still playing or
3. Whether the gameplay is completed.

Other attributes of such a group dataset include:
1. How many users have accepted the game offer.
2. Whether the game is open for new players to join. Some games can be joined at any time while in progress (e.g. typical shoot them up type games), other games can be joined only at certain times (e.g. poker games can be joined only between hands), other games cannot be joined at all once they have started (e.g. tennis doubles). Many games will have a maximum number of players and cannot be joined if the maximum is reached.

At this stage of operation of the match maker application 1808, a game offer has been created (conceptually an offer to play is extended by one user to other users) and group datasets representing the game offer and the corresponding client group are available to the Clients 1812. The clients 1812 may request that the match maker application 1808 send them those group datasets.

Now when further users select a game title, not only are group datasets for user client groups transmitted in response; but also group datasets representing game offers and game instances are transmitted.

An image is presented to the gamester (user) for each dataset representing a game instance and for each dataset representing a game offer, and importantly the image is selected and/or varied according to the values of the attributes representing the game state and the values of other game related attributes.

Figure 1:
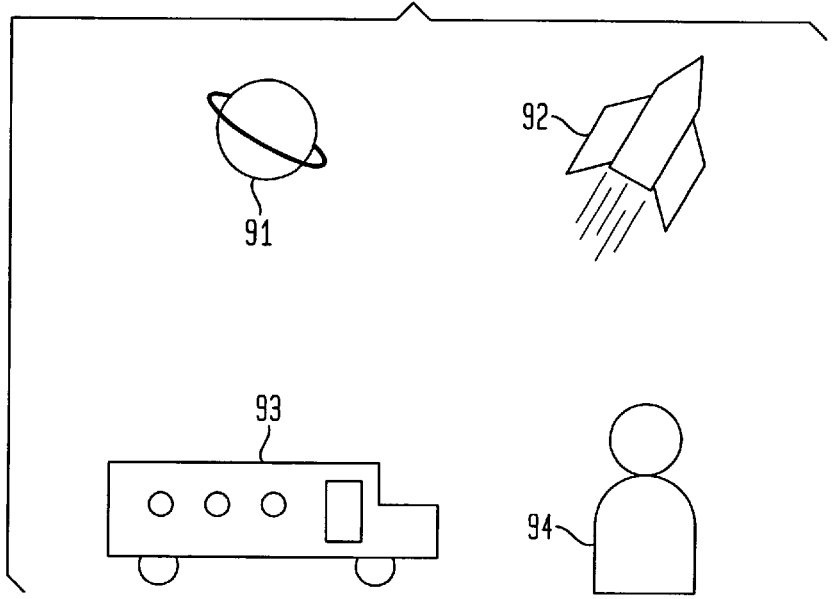
FIG. 1 illustrates graphical images used by an embodiment of the invention.

FIG. 1 illustrates examples of how selected images may be used to represent the values of attributes in a group dataset. For example, graphical image 91 uses a planet icon to represent a game offer where the game playing has not yet started. This image represents a game offer group dataset. Graphical image 92 uses a rocket icon to represent a game offer where the game playing has started and where it is not possible for latecomers to join the game. Accordingly, this image illustrates a game instance group dataset. Graphical image 93 uses an omnibus icon to represent a game offer where the game playing has started and where it is possible for latecomers to join the game. Such a game is commonly termed a "drop-in game". Graphical image 94 uses a humanoid icon to represent a potential player who is not presently associated with any game offer nor any playing game. Thus, as illustrated by this figure, the non-textual feature that is varied to communicate information about attributes to the user can be the entire graphical image.

Figure 2:
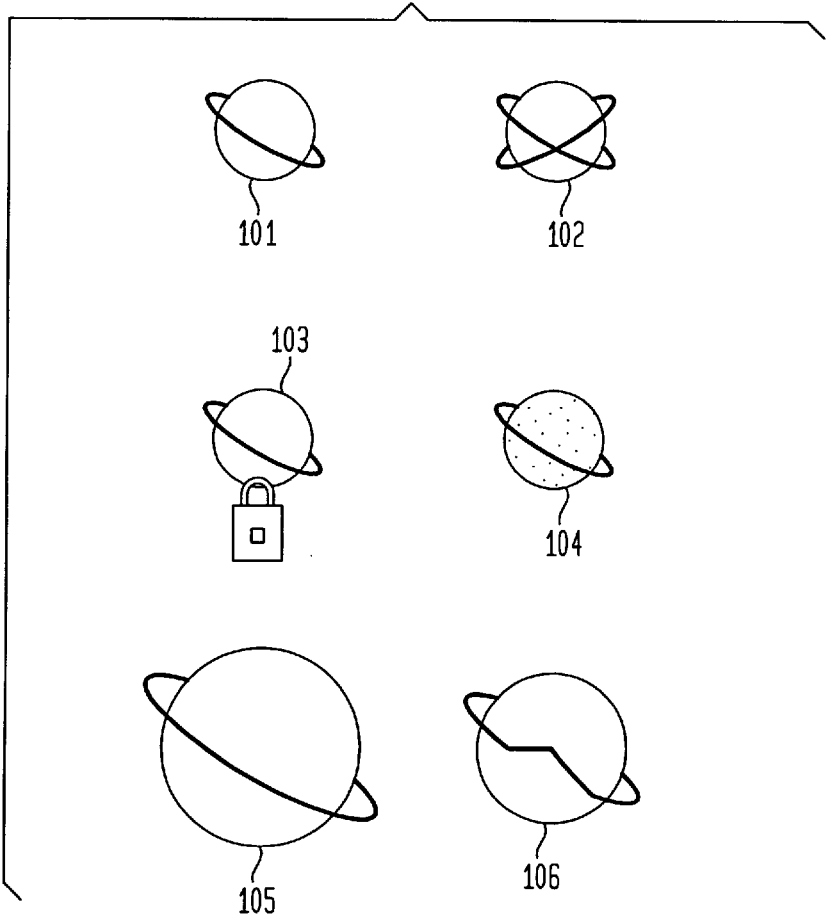
FIG. 2 illustrates graphical images in which non-textual elements are varied to communicate with users.

FIG. 2 illustrates examples of how portions of graphical images or other features of graphical images may be varied or modified to represent varying attributes. In particular, graphical image 101 uses a planet icon to represent a game offer. Graphical image 102 uses a planet icon with an extra ring to represent a game offer that is open only to expert players. Graphical image 103 uses a planet icon with a lock attached to represent a game offer which is open to some Clients but which is not open to the particular Client that is viewing the offer. Graphical image 104 uses a planet icon with extra shading to represent a game offer for which the players presently accepting that offer all have excellent quality data communications links to a particular game server computer. Graphical image 105 uses a planet icon that has been enlarged to represent a game offer that has a large number of gamesters presently attached to it. Graphical image 106 uses a planet icon that has been elongated to represent a game offer to play a game using only a certain subset of the game's features. Other non-textual elements of graphical images may be varied to provide visual cues to users about particular values of a variety of attributes of client groups. Thus, the present embodiment associates a unique graphical image with a particular client group or with a particular group dataset, for example. I.e. each client group or each group dataset is uniquely represented by a particular graphical image. The characteristics of the graphical image can be varied to represent the characteristics of the attributes of the particular client group or the particular group dataset.

Another attribute at this level is the quality of the communications link to the game servers available. The values of this attribute may be represented as the color, or more exactly the hue, of the graphical image. Communications link quality properties and their use in match makers are discussed in U.S. Pat. No. 5,828,843 issued to Grimm et al. For example, a planet icon may be given a green hue to represent a game offer where the players who have accepted that offer all have sufficiently good communications links to enable good gameplay. Conversely a planet icon may be given a red hue to indicate that the user viewing the game offer should not attempt to join that offer since the players already joined into that offer are so far distant (in network topology terms) that good gameplay is unlikely to be possible with those players (in that particular game offer).

In addition to hue, color saturation may be used to represent attributes, and there are may more possibilities such as animation, spacing between icons and the like. Many image selections and modifications are difficult to represent in monochrome figures but may be used to represent properties.

Users may stimulate the Client to transmit requests to join a match option. The term match option is used herein to refer to any one of:

1. a match offer (sometimes called a user match offer or user created match offer)
2. an automatic offer (sometimes called an automatic match or automatic match offer) or
3. an executing application instance (typically used in the context of a game program instance wherein it is possible for a further player to join the game, but not limited to that context).

Each of the above types of match option is described in U.S. Pat. No. 5,828,843 issued to Grimm et al. having even though the term match option may not be used therein to refer to them collectively.

Figure 19:
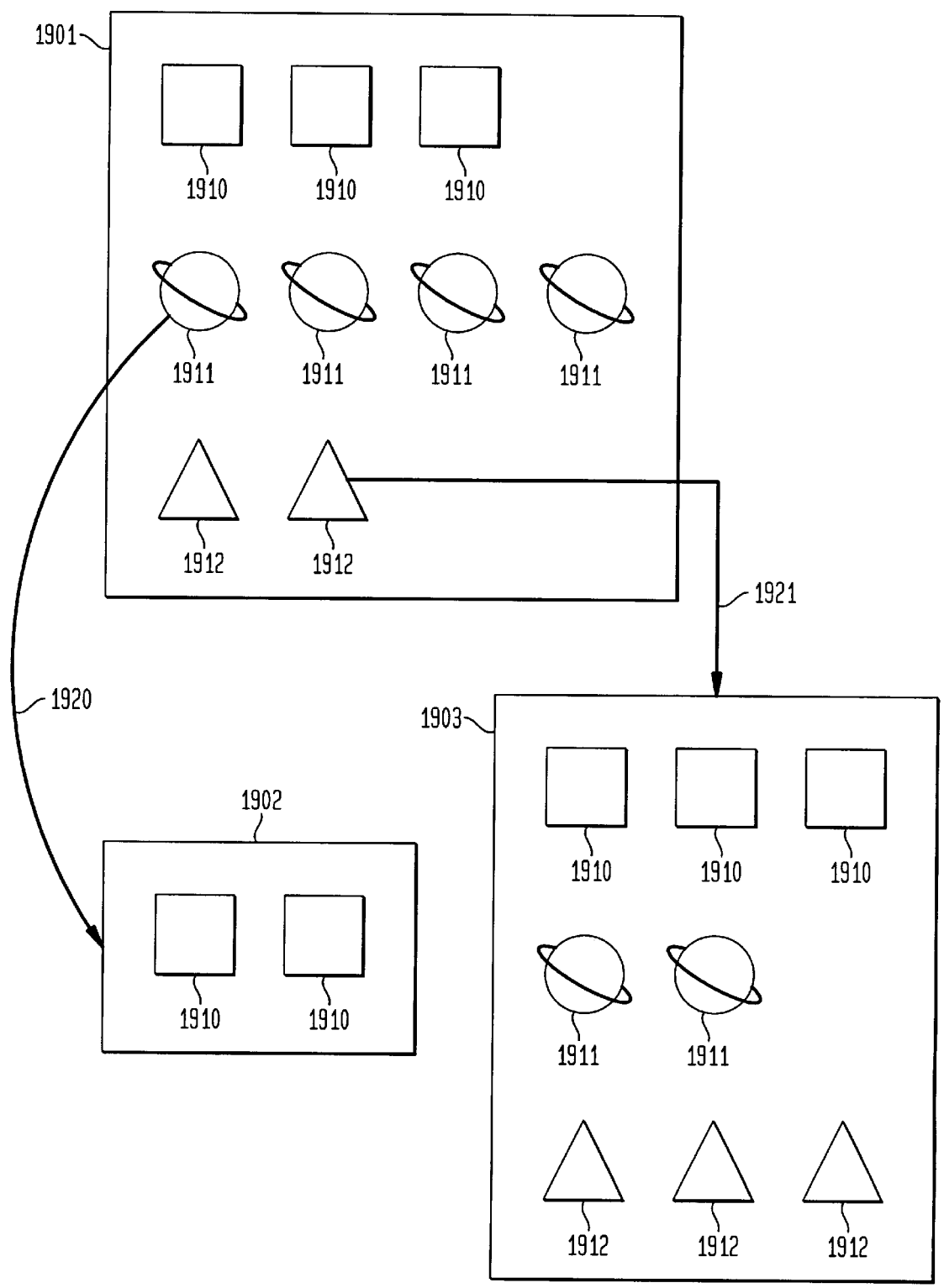
FIG. 19 illustrates a variety of screen views that might be used by an embodiment of the invention.

The actual appearance of screens upon video displays and the representations of the features disclosed herein may vary greatly. FIG. 19 illustrates one possible example. In this figure, a user sees a view 1901 of a screen with representations of many group datasets. Some of the images 1911 are for datasets which represent match options. Other images 1910 are for datasets which each represent only one Client. Still other images 1912 represent lobby groups (which are groups of Clients that have selected a particular game title). In alternate embodiments, images may be used to represent a variety of other types of client groups.

The manner of response to stimuli may vary greatly amongst implementations also. As a possible example, still referring to FIG. 19, a user may stimulate the match maker application to explore references to a match option 1911 by stimulating an image 1911. This may cause a transition 1920 from one view 1901, which includes images 1911 for match offers, to another view 1902 which includes only images 1910 that represent only client datasets, for example. Alternatively in this example there may be a transition 1921 from a view 1901 that includes many types of images 1910, 1911, 1912 that represent client groups and/or client group data sets to another view 1903 that also includes many types of images that represent client groups and/or client group data sets. In this example, views 1901 and 1903 may both be considered to be views of lobby groups. Each view may be adapted to represent only particular types of client groups (e.g. one type or a limited variety of types). The graphical images thus, can provide the user with a conveniently understood method of navigating amongst client group information.

Users may also stimulate the Client to transmit requests to change the value of an attribute, typically this is used to cause the game program to be launched by advancing the state of a progress attribute.

The following description further describes an embodiment directed to game offers. It should be borne in mind that the embodiment described, though of the best mode presently envisioned, is but an example, and in a typical operation there can be many more of the various entities mentioned. For example, for clarity, the embodiment described deals with a mere four games titles and two client computers, but more typically there might be several dozen game titles and perhaps hundreds of thousands of client computers and client applications in a real situation. The embodiment can be extended to cover the greater quantities of the artifacts. Also though this example deals with simple game offers, selective and repetitive application of the actions described will produce a reasonable representation of tournaments, ladders, leagues and the like.

Figure 3:
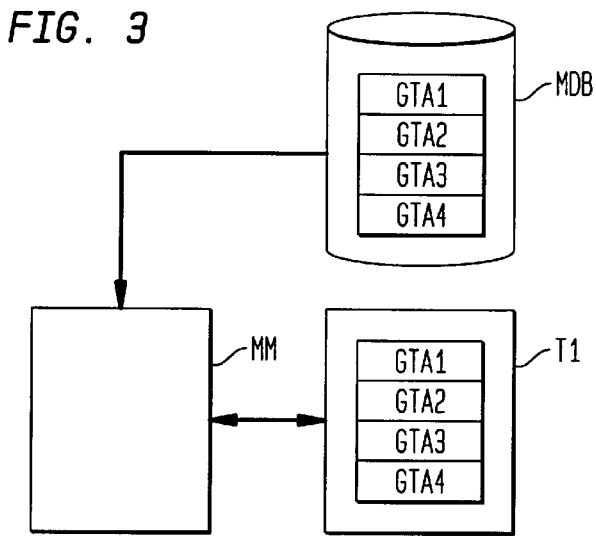
FIG. 3 illustrates a match maker application reading from a master database.

Referring to FIG. 3, a match maker application (N) reads from a master database (MDB) that contains the values of attributes for four games titles (GTA1, GTA2, GTA3, GTA4) and compiles those values into an internal table (T1).

Figure 4:
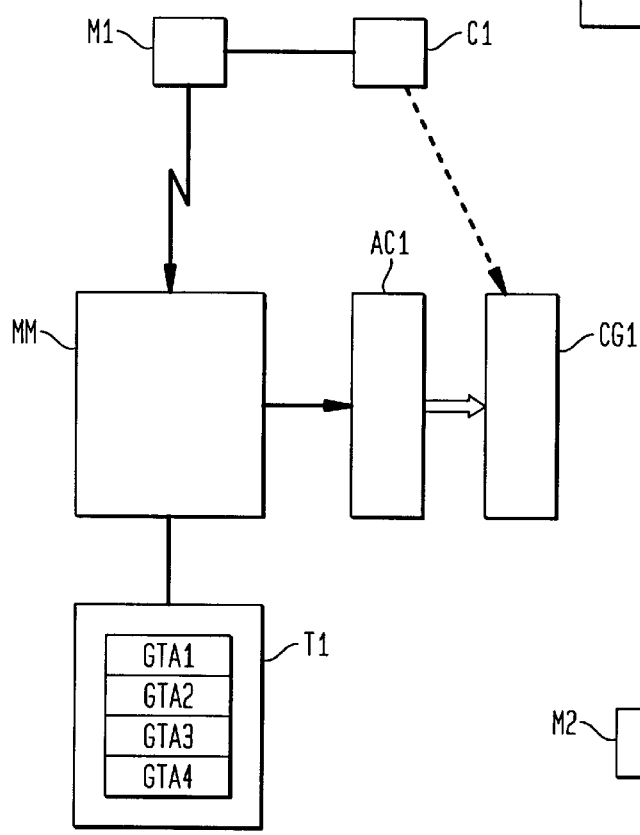
FIG. 4 illustrates a client attaching to a match maker application and the match maker application creating a new group dataset to represent a new client group.

Referring to FIG. 4, Client C1 attaches to match maker MM by means of message M1, and MM responds by creating a new group dataset AC1 that represents the client group CG1. The group dataset AC1 includes values of attributes associated with Client C1.

Figure 5:
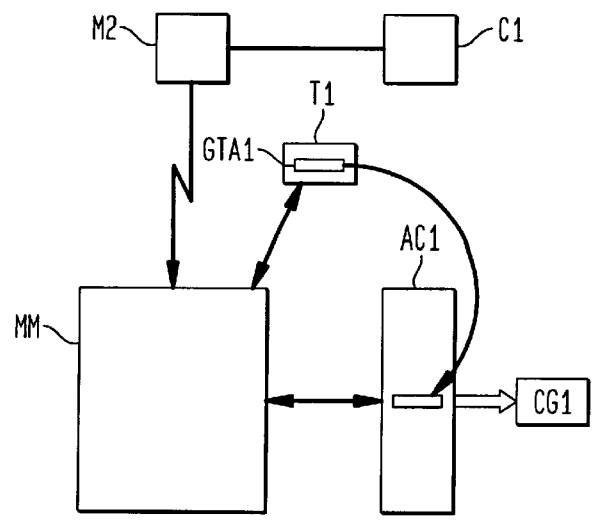
FIG. 5 illustrates the client of FIG. 4 notifying the match maker application that the client wishes to participate in a particular application title and illustrates the match maker application updating a group dataset associated with the client.

Referring to FIG. 5, Client C1 notifies match maker MM by means of message M2 that it wishes to be a candidate to play a particular game title. MM determines by reference to table T1 that the game title specified by M2 is the game title for which the values of attributes are GTA1. In response to message M2, MM updates the group dataset AC1 representing client group CG1 to also contain a copy of the values of the attribute data GTA1. A group dataset that represents a client may be referred to as a client group dataset.

Figure 6:
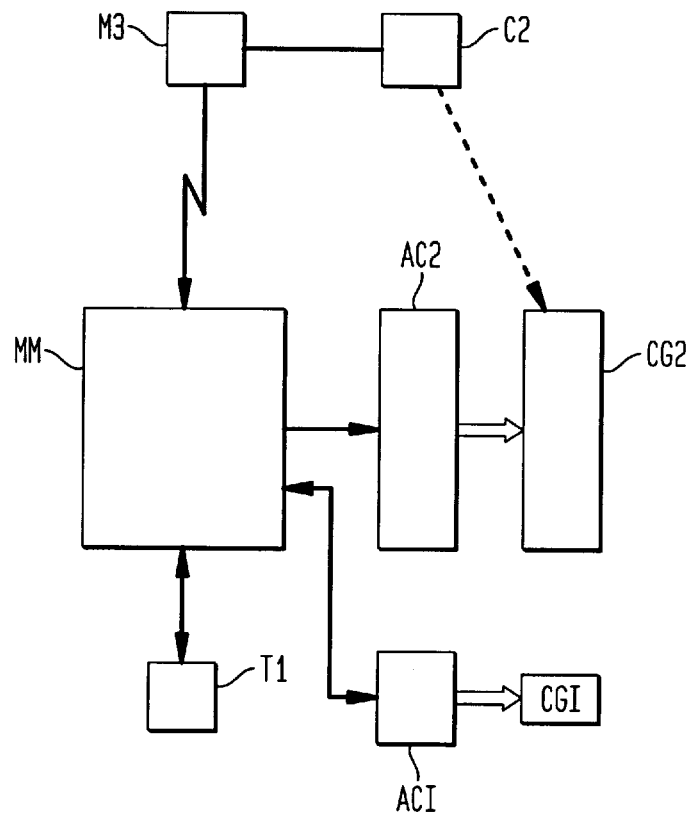
FIG. 6 illustrates a second client attaching to the match maker application and the match maker application creating a new group dataset to represent the second new client group.

Referring to FIG. 6, Client C2 attaches to match maker MM by means of message M3, and MM responds by creating a group dataset AC2 that represents a new client group CG2. The client group dataset AC2 contains values of attributes associated with Client C2.

Figure 7:
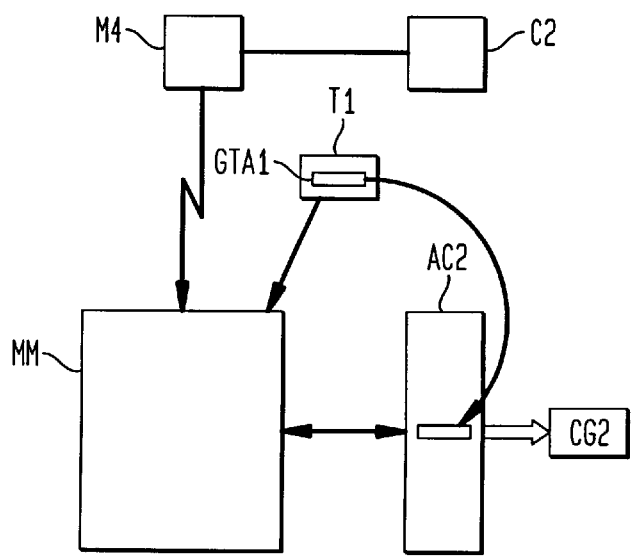
FIG. 7 illustrates the second client notifying the match maker application that the client wishes to participate in a particular application title and illustrates the match maker application updating a group dataset associated with the second client.

Referring to FIG. 7, Client C2 notifies match maker MM by means of message M4 that it wishes to be a candidate to play a particular game title. MM determines by reference to table T1 that game title specified by M4 is the game title for which the values of attributes are GTA1. In response to message M4, MM updates the group dataset AC2 representing client group CG2 to also contain a copy of the values of the attribute data GTA1.

Figure 8:
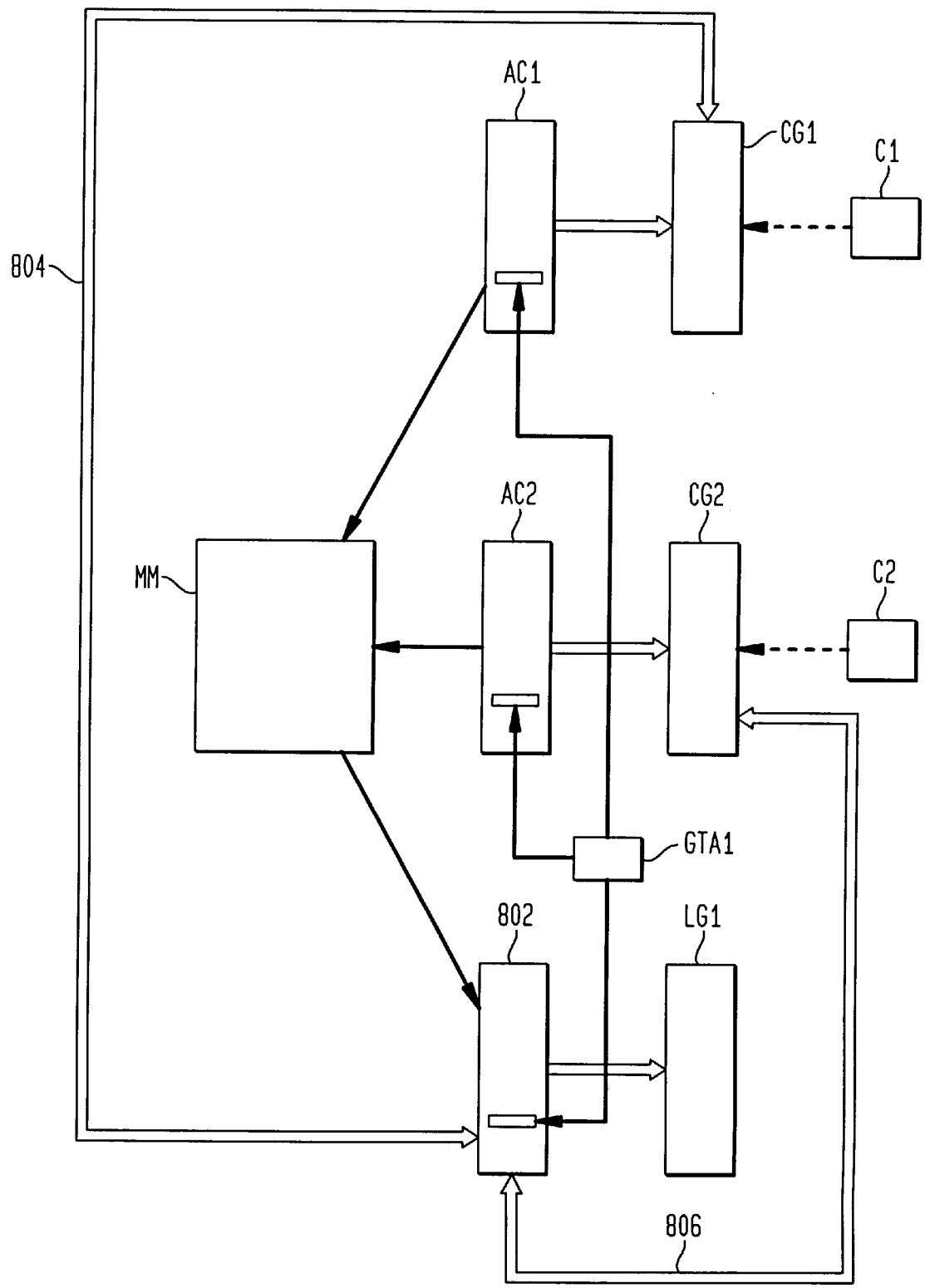
FIG. 8 illustrates the match maker application identifying a match and creating a new client group and an associated dataset representing the new client group.

Referring to FIG. 8, as the dataset representing each client group (CG1, CG2) is updated, the match maker MM examines the datasets representing every other client group for matching game title attribute values. A match of a game title is found in that the dataset that represents client group CG1 and the dataset that represents client group CG2 both contain a copy of the attribute values GTA1 associated with the particular game title. In response to finding a match, a dataset 802 representing a client group LG1 is created by the match maker MM. When a client group is formed in the manner that client group LG1 is formed it is sometimes termed a lobby group. It is important to note that the match maker also builds a relationship (hierarchical in this case) in that the match maker adds to the dataset representing LG1 a reference 804 to the dataset representing CG1 and a reference 806 to the dataset representing CG2. The converse relationship is also maintained. In addition, the dataset representing client group CG1 is updated to contain a reference to the dataset representing LG1 and the dataset representing CG2 is updated to contain a reference to the dataset representing LG1. (References 804 and 806 illustrate in FIG. 8 these references in both directions). The dataset 802 representing LG1 thus contains at least a copy of the values of the attributes of GTA1 and references to the datasets representing CG1 and CG2.

Figure 9:
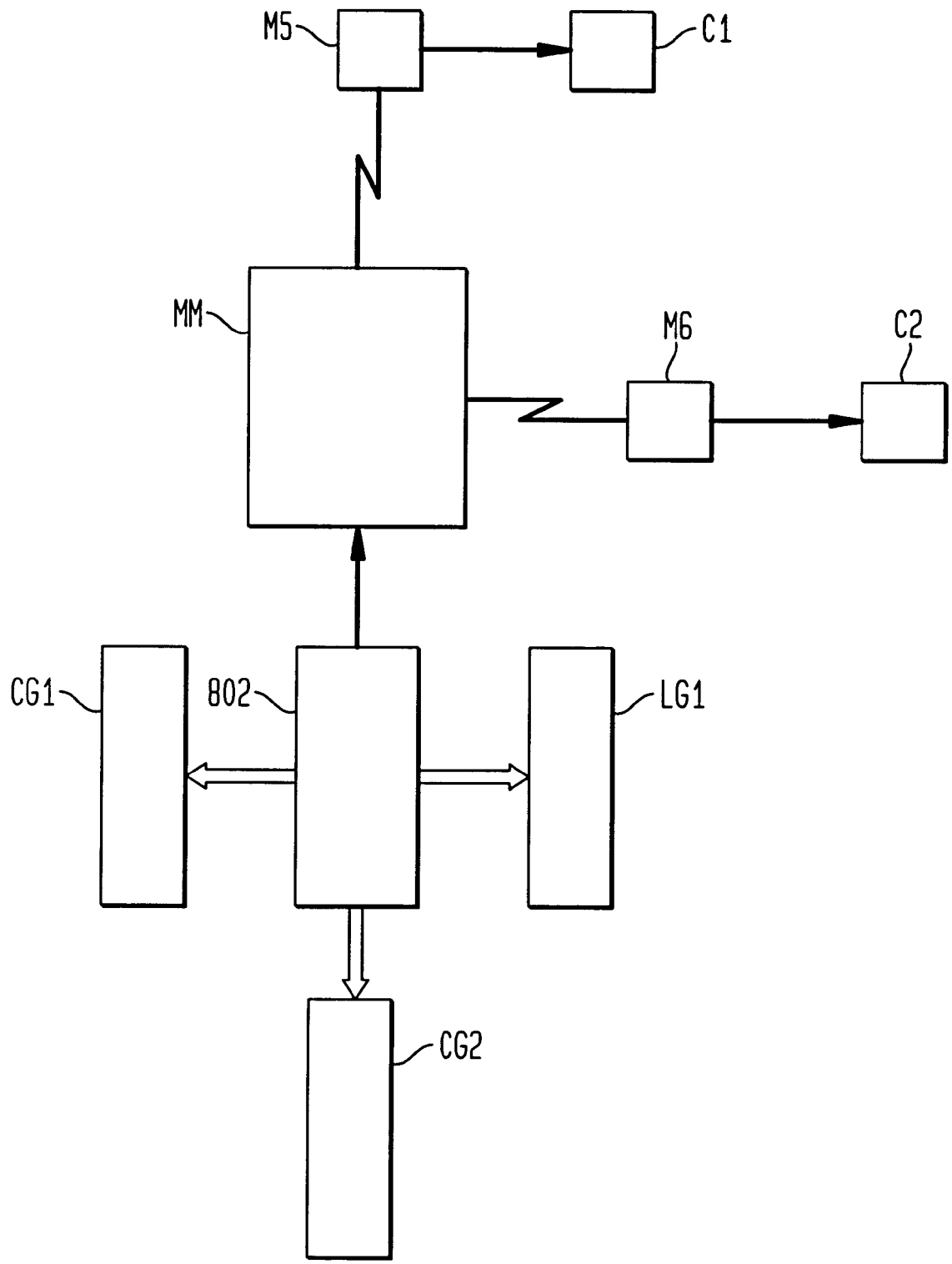
FIG. 9 illustrates the match maker application sending messages to the matched clients in the new client group of FIG. 8 informing them of the match.

Referring to FIG. 9, match maker MM composes and sends further messages. Message M5 is sent to Client C1 and message M6 is sent to client C2. These messages M5, M6 contain a copy of the values of the attributes stored in the dataset 802 that represents LG1 and a copy of the references 804 and 806 to the datasets representing CG1 and CG2, respectively.

Figure 10:
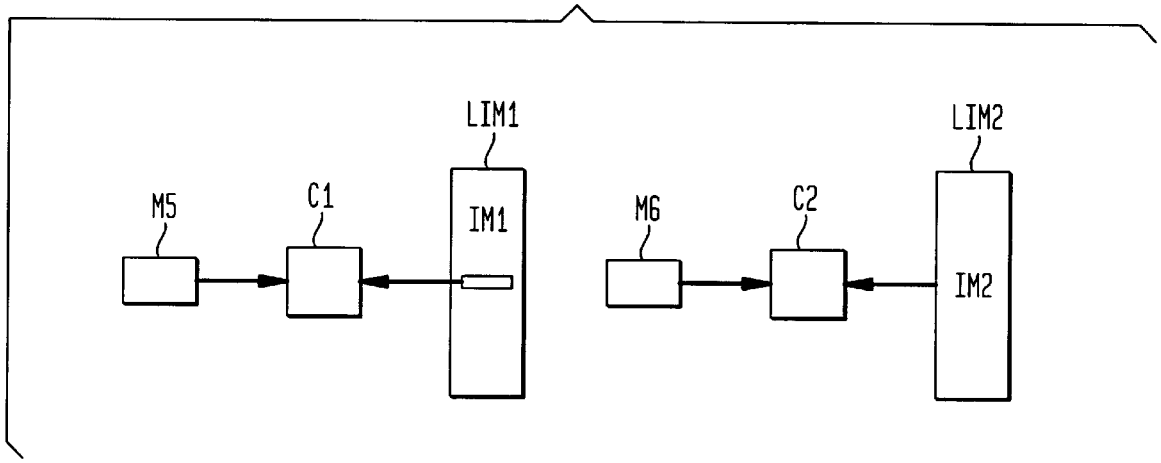
FIG. 10 illustrates the clients receiving the messages sent in FIG. 9, and responding by displaying images that represent the messages.

Referring to FIG. 10, message M5 is received by client C1. In response, client C1 selects at least one chosen image IM1 from a predefined library of images LIM1 to represent the values of the attributes in at least the dataset 802. Again, dataset 802 represents LG1 (FIG. 9) and the values of the attributes of this dataset are communicated to client C1 by the message M5. Similarly message M6 is received by client C2. In response, client C2 selects a chosen image IM2 from a further predefined library of images LIM2 to represent the values of the attributes in the dataset 802. The values of the dataset 802 are communicated to client C2 by message M6. The respective images are displayed upon the video display of the user associated with each client so that he or she is aware of the other client and that the clients are in some sense compatible at least in terms of game title selection.

Figure 11:
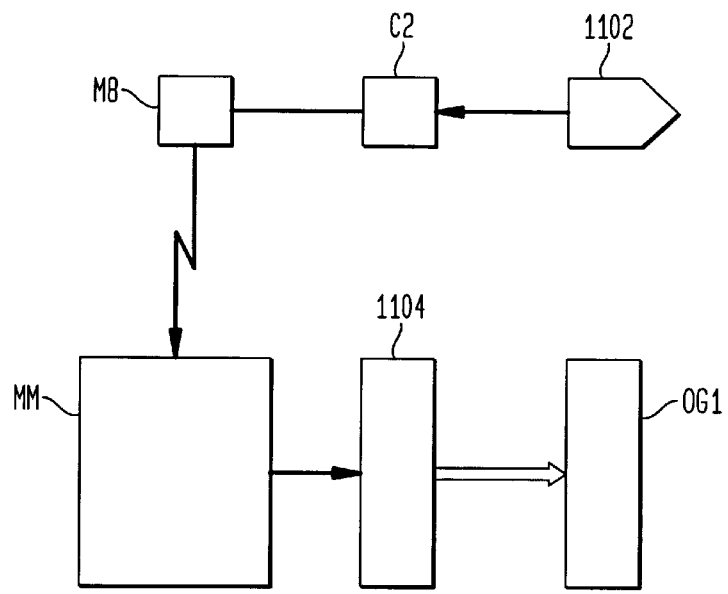
FIG. 11 illustrates one of the clients initiating the formation of a game offer client group.

Referring to FIG. 11, the user 1102 associated with client C2, stimulates client C2 to initiate a game offer and a message M8 reflecting that action is sent to match maker MM. Match maker MM responds by creating a dataset 1104 representing still a further client group OG1. This dataset contains values of attributes associated with client C2 and values of attributes associated with the game title selected by client C2. That is client group OG1 contains copies of the values of the attributes in the dataset AC2 and of the values of the attributes of GTA1. When a client group is formed in the manner that client group OG1 is formed, it is sometimes termed a game offer group and the dataset that represents it may be called a game offer dataset.

Figure 12:
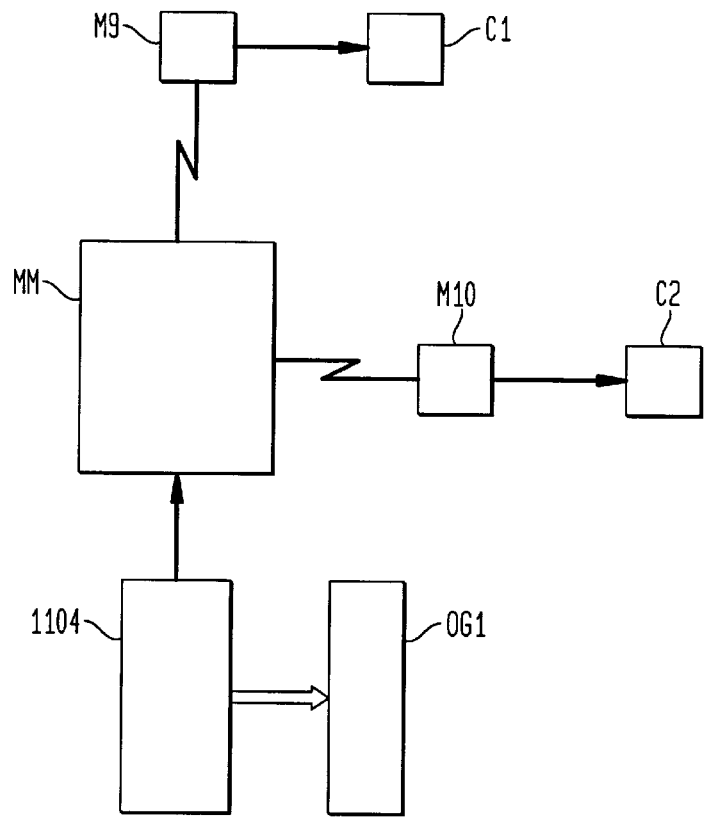
FIG. 12 illustrates the match maker communicating with clients about the game offer client group of FIG. 11.

Referring to FIG. 12, match maker MM composes and sends further messages. Message M9 is sent to client C1 and message M10 is sent to client C2. These messages contain copies of the values of the attributes in the dataset 1104 that represents client group OG1.

Figure 13:
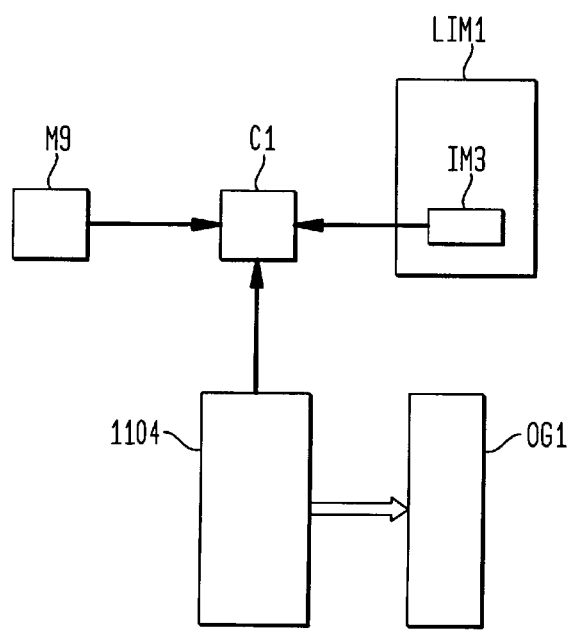
FIG. 13 illustrates a client selecting a game offer using a graphical image.
Figure 21:
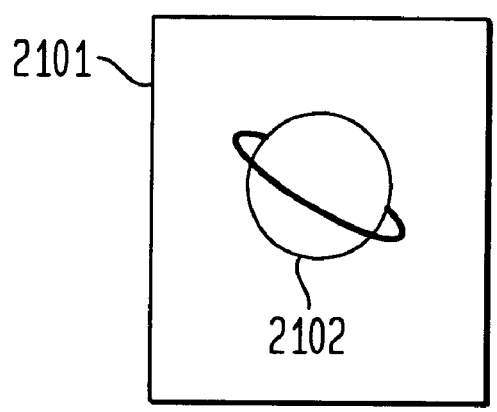
FIG. 21 illustrates a graphical representation of the game offer as displayed by client C1 and as discussed in conjunction with the discussion of FIG. 13.

Referring to FIG. 13, Client C1 receives the message M9 and responds by selecting a predefined image (IM3) to represent a game offer in the present state of the game offer as reflected by the values of the game attributes and the values of the attributes representing client group OG1. Client C1 displays this graphical image of the game offer to its user. Referring to FIG. 21, the view 2101 is displayed to the user associated with client C1. This view includes image 2102 that represents a game offer.

Figure 14:
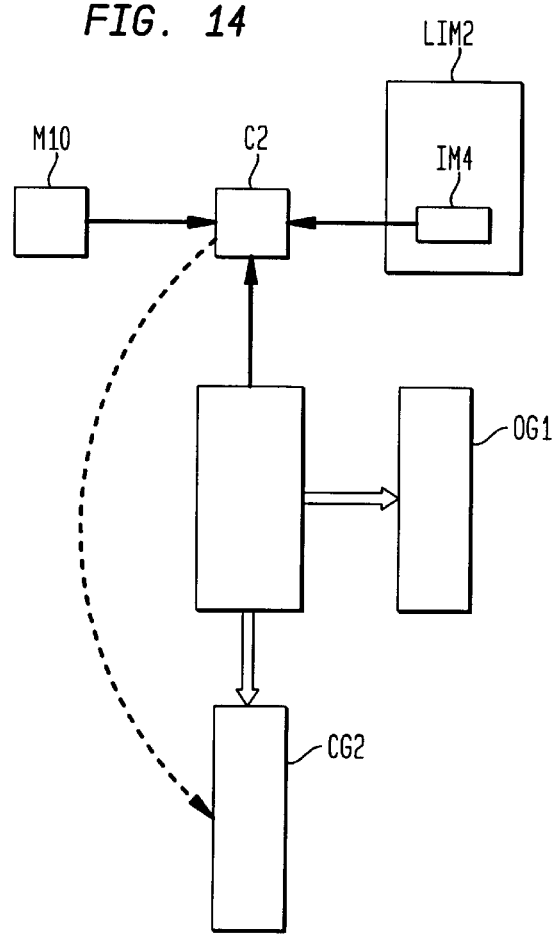
FIG. 14 illustrates the match maker application informing a client of the client's own game offer and displaying the client's own game offer to the user.
Figure 20:
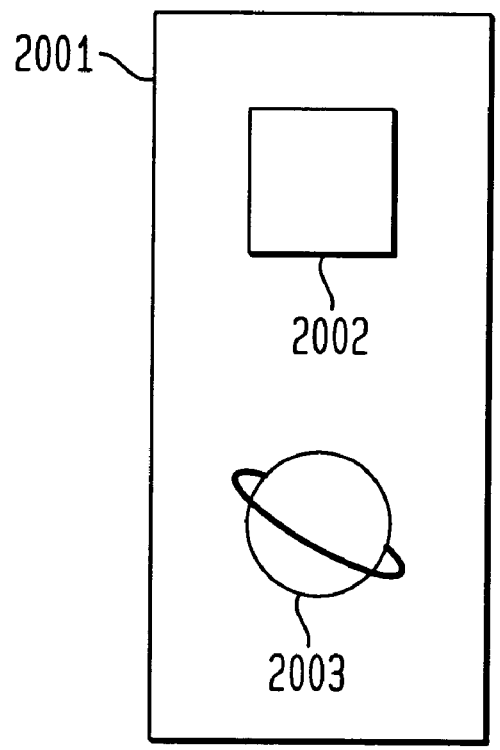
FIG. 20 illustrates a graphical representation of the game offer and of client C2 as displayed by client C2 and as discussed in conjunction with the discussion of FIG. 14.

Referring to FIG. 14, Client C2 receives the message M10 and responds to it. However the dataset representing client group CG2 is referenced in the dataset representing client group OG1. Consequently, instead of selecting an image to represent the dataset that represents the game offer (as C1 did in FIG. 13), client C2 selects images that represent the datasets representing all of the client groups referred to in the dataset representing client group OG1. At this point the only referenced client group dataset is CG2 itself So client C2 selects an image IM4 that represents client C2 itself This can usefully be thought of as client C2 looking at his own game offer and being the only player presently signed up for that particular game offer. The dataset representing OG1 did not reference the dataset representing CG1. Therefore client C1 responds differently to message M9 than client C2 responded to message M10. In particular, client C2 responds by displaying an image of a game offer and an image representing the other client groups associated with that game offer. Referring to FIG. 20, the view 2001 is displayed to the user associated with client C2 at this point. This view 2001 includes the image 2003 that represents the game offer and includes the image 2002 that represents the client C2 itself.

Figure 15:
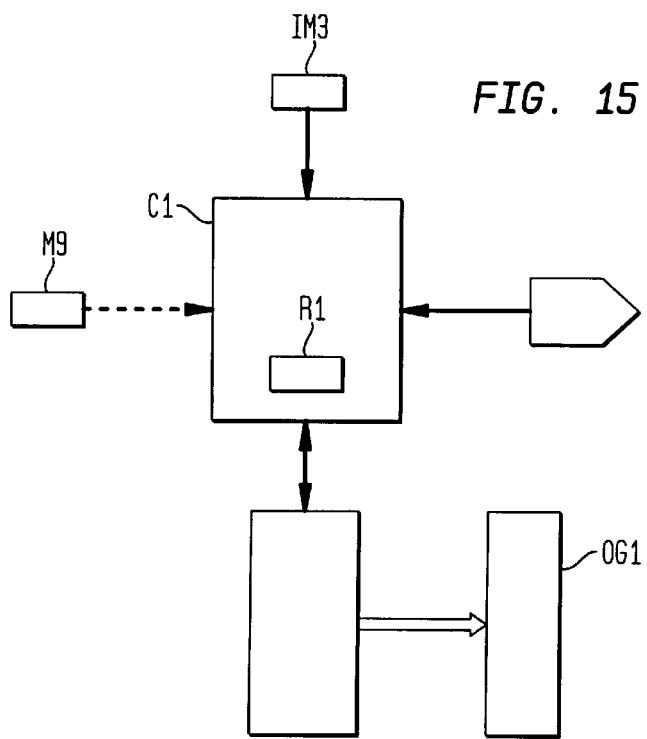
FIG. 15 illustrates another client requesting that it be associated with a game offer client group of FIG. 14.

Referring to FIG. 15, the user 1502 associated with client C1 stimulates client C1 by stimulating the image IM3 to initiate a request (R1) wherein the request R1 is to be associated with client group OG1. Client C1 still retains a copy of message M9 and thus is able to determine the reverse mapping from IM3 stimulation to the dataset representing client group OG1. A stimulation may be embodied as a computer mouse click or in some other ways.

Figure 16:
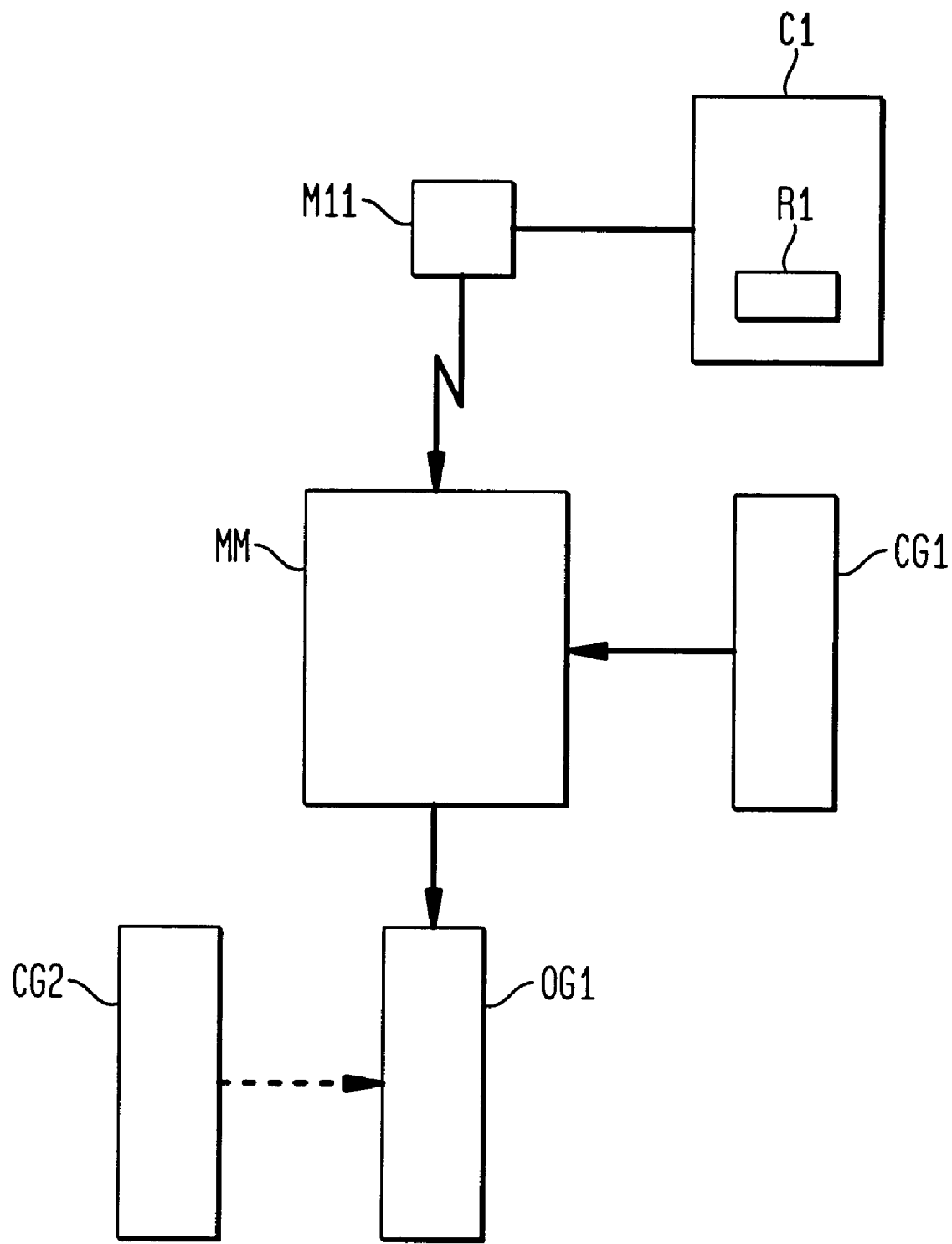
FIG. 16 illustrates the request of FIG. 15 being sent to the match maker application and the match maker application responding by including another client in the game offer client group and establishing relationships between client groups.

Referring to FIG. 16, Client C1 sends message M11 that contains data representing the request R1 to match maker MM. Match maker MM responds by merging data representing client group CG1 into OG1. Accordingly, datasets representing both CG1 and CG2 have been merged into OG1. Upon merging these datasets into OG1, the MM software establishes a hierarchical relationship between the datasets representing client groups CG1 and CG2 and the dataset representing client group OG1. In particular, the datasets representing client groups CG1 and CG2 are in some sense sparser or lower in the hierarchy than is the dataset representing client group OG1.

Figure 17:
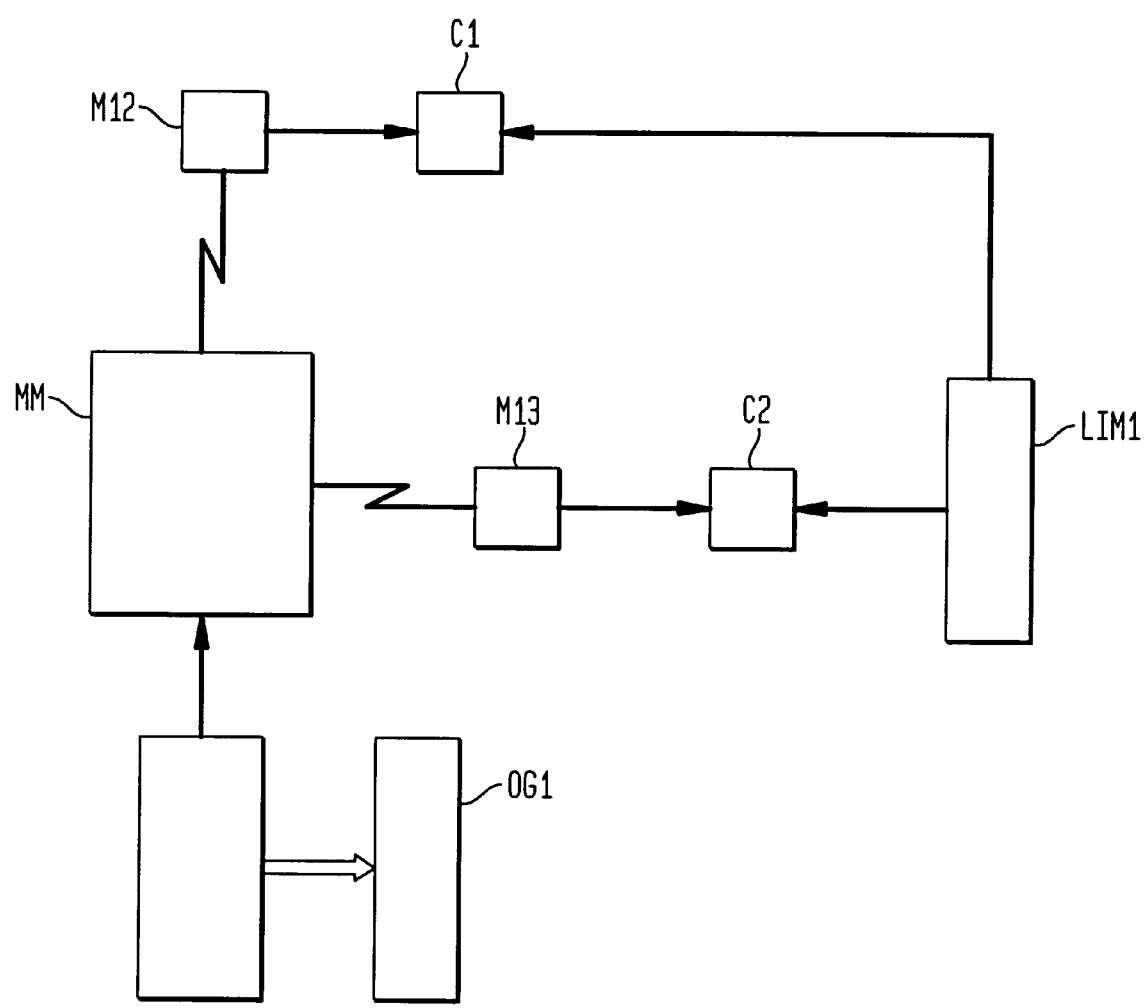
FIG. 17 illustrates a client launching a game.

Referring to FIG. 17, match maker MM sends further messages M12 to client C1 and M13 to client C2 that reflect the new values of the attributes of OG1, including the representation of the hierarchy discussed above. In response to these further messages M12, M13, clients C1 and C2 each select images, from image library LIM1 and L1M2, respectively, that represent the datasets that represent client groups CG1 and CG2, since CG1 and CG2 are each referenced in the dataset representing client group OG1. These images are then varied according to the values of the attributes in the dataset that represents OG1, and then the images are displayed. These attributes of OG1 that determine the image variations typically include player attributes and communications attributes as described in U.S. Pat. No. 5,828,843 issued to Grimm et al.

The user of Client C2 (who originated the game offer) sees that the images as updated on his screen indicate that a correct number of appropriately attributed clients are enjoined into the game offer and the user associated with client C2 stimulates the client C2 to request from the match maker the advancement of the game progress state associated with OG1. The match maker notifies clients C1 and C2 that the game progress state has advanced by means of messages, and in response to receiving those messages the clients C1 and C2 cause the game application to be launched. To the casual observer this is seen as the moment the gameplay actually starts.

While Applicant has described the invention in terms of specific embodiments, the invention is not limited to or by the disclosed embodiments. The Applicant's invention may be applied beyond the particular systems mentioned as examples in this specification. It is to be understood that even though embodiments and advantages of the present invention have been set forth in the foregoing description, the above disclosure is illustrative only, and changes may be made in detail yet remain within the broad principles of the invention. Therefore the present invention is to be limited only by the appended claims.

What is claimed is:

1. A method of assisting a user to influence a match maker application, the method comprising the steps of:

providing a first client computer said first client computer executing a first cooperating client application wherein the first cooperating client application cooperates with the match maker application by exchanging information with the match maker application;

providing a second client computer being equipped with a video display, said second client computer executing a second cooperating client application wherein the second cooperating client application cooperates with the match maker application by exchanging information with the match maker application;

providing a host computer hosting the match maker application, the match maker application maintaining a plurality of group datasets, wherein each group dataset of the plurality of group datasets includes values of each of a plurality of attributes, wherein the plurality of attributes include attributes associated with a group of cooperating client applications, wherein the group of cooperating client applications includes said first cooperating client application, wherein each of the group of cooperating client applications cooperates with the match maker application by exchanging information with the match maker application;

selecting at least one value of at least one attribute wherein the at least one attribute is associated with said first cooperating client application, said at least one value being included in at least one group dataset being included in the plurality of group datasets being maintained upon the host computer;

transmitting from said match maker application on said host computer a message including said at least one value;

receiving said message by said second cooperating client application on said second client computer; and in response to receiving said message, displaying upon said video display of said second client computer a first graphical image having a pre-defined non-textual feature wherein the pre-defined non-textual feature represents said at least one value included in said message.

2. The method of claim 1, further comprising the steps of the second client computer accepting a stimulus of the graphical image by the user; and the second client computer responding to the stimulus.

3. As The method of claim 2, wherein the step of responding to the stimulus comprises the step of the second client computer sending a second message to the match maker application to inform the match maker application regarding the stimulus by the user.

4. The method of claim 3, further comprising the step of:
the match maker application including in the at least one group dataset values of attributes of a group dataset that represents the second client application in response to being informed regarding the stimulus by the user.

5. The method of claim 4, further comprising the step of sending a third message to the first client application and sending a fourth message to the second client application to inform the first and second client applications of the values in the at least one group data set after the values of the attributes of the group dataset that represents the second client application have been included in the at least one group data set.

6. The method of claim 5, further comprising the step of:
in response to receiving said third message, displaying upon said video display of said first client computer a second graphical image having a pre-defined non-textual feature wherein the pre-defined non-textual feature of the second graphical image represents the values of the attributes of the at least one group dataset.

7. The method of claim 6, further comprising the step of:
in response to receiving said fourth message, displaying upon a video display of said second client computer a third graphical image having a pre-defined non-textual feature wherein the pre-defined non-textual feature of the third graphical image represents the values of the attributes of the at least one group dataset.

8. The method of claim 6, further comprising the step of:
the first client computer accepting a stimulus of the second graphical image by the user;
the first client computer responding to the stimulus of the second graphical image by creating an application instance of the first cooperating client application.

9. The method of claim 1, wherein the first graphical image comprises an icon.

10. The method of claim 1, wherein the first graphical image comprises a digitized photograph.

11. The method of claim 1, wherein the first graphical image comprises a drawing.

12. The method of claim 1, wherein the first graphical image comprises an ornamental pattern.

13. The method of claim 1, wherein the first graphical image comprises an abstract pattern.

14. The method of claim 1, wherein the predefined non-textual feature comprises a shading of at least a part of the first graphical image.

15. The method of claim 1, wherein the predefined non-textual feature comprises a shape of at least a part of the first graphical image.

16. The method of claim 1, wherein the predefined non-textual feature comprises a hue of at least a part of the first graphical image.

17. The method of claim 1, wherein the predefined non-textual feature comprises a size of at least a part of the first graphical image.

18. The method of claim 1, wherein the predefined non-textual feature comprises a color saturation of at least a part of the first graphical image.

19. The method of claim 1, wherein the predefined non-textual feature comprises a brightness of at least a part of the first graphical image.

20. The method of claim 1, wherein the predefined non-textual feature comprises a rotational orientation of at least a part of the first graphical image.

21. The method of claim 1, wherein the predefined non-textual feature comprises a lateral inversion of at least a part of the first graphical image.

22. The method of claim 1, wherein the predefined non-textual feature comprises a spacing between elements of at least a part of the first graphical image.

23. The method of claim 1, wherein the predefined non-textual feature comprises an animation speed of at least a part of the first graphical image.

24. The method of claim 1, wherein the predefined non-textual feature comprises an animation polarity of at least a part of the first graphical image.

25. The method of claim 1, wherein the predefined non-textual feature comprises a keystone distortion of at least a part of the first graphical image.

26. The method of claim 1, wherein the predefined non-textual feature comprises a pincushion distortion of at least a part of the first graphical image.

27. The method of claim 1, wherein the predefined non-textual feature comprises an elongation of at least a part of the first graphical image.

28. The method of claim 1, wherein the match maker application is executed across a plurality of host computers further comprising the step of providing a second host computer that also hosts the match maker application.

29. A method of allowing a user to navigate between client groups associated with a match maker application, the method comprising the steps of:

executing the match maker application on a host computer;

hosting using the match maker application a first, a second and a third client application wherein the first client application is executed by a first client computer, the second client application is executed by a second client computer and the third client application is executed by a third client computer, wherein the first, second and third client computers are each coupled to the host computer, wherein the first client application and the first client computer are associated with the user and wherein the first client computer includes a video display;

maintaining on the host computer a first group dataset that represents a first client group wherein the first client group includes the first, second and third client applications;

displaying to the user on the video display a first graphical image representing a match option wherein the match option is associated with at least one of the second and the third client applications and wherein the graphical image allows the user to select the match option;

associating the first client application with the match option in response to selection of the first graphical image by the user by forming a second group dataset representing a second client group wherein the second client group is a subset of the first client group and wherein the second client group includes the first client application and the at least one of the second and third client applications;

displaying to the user on the video display a second graphical image that represents the second group dataset.

30. The method of claim 29, further comprising the step of:

displaying on a video display to a user of one of the second and third client computers a third graphical image that represents the second group dataset.

31. The method of claim 30, wherein the third graphical image comprises a pre-defined non-textual feature wherein the pre-defined non-textual feature represents at least one value of at least one attribute of the second group dataset.

32. The method of claim 29, further comprising the step of displaying on a video display to a user of each of the second and third client computers a third graphical image that represents the second group dataset.

33. The method of claim 32, wherein the third graphical image comprises a pre-defined non-textual feature wherein the pre-defined non-textual feature represents at least one value of at least one attribute of the second group dataset.

34. The method of claim 29, wherein the match option comprises a match offer.

35. The method of claim 29, wherein the match option comprises an automatic offer.

36. The method of claim 29, wherein the first graphical image comprises a pre-defined non-textual feature wherein the pre-defined non-textual feature represents at least one value of at least one attribute of the first group dataset.

37. The method of claim 29, wherein the second graphical image comprises a pre-defined non-textual feature wherein the pre-defined non-textual feature represents at least one value of at least one attribute of the second group dataset.

38. The method of claim 29, wherein the match option comprises an executing application instance.

39. The method of claim 38, wherein the executing application instance comprises a multi-user game.

40. The method of claim 38, wherein the executing application instance comprises a centralized electronic data processing application.

41. The method of claim 38, wherein the executing application instance comprises an online multi-instanced application.

42. A method for allowing a first user to communicate values of attributes to a second user, via a match making application, comprising the steps of:

(1) executing the match making application on a host computer;

(2) receiving, at said host computer, a first message from a first client application, wherein said first message allows said first client application to attach to the match making application, and wherein said first message includes a first plurality of attributes associated with said first client application;

(3) receiving, at said host computer, a second message from a second client application, wherein said second message allows said second client application to attach to the match making application, and wherein said second message includes a second plurality of attributes associated with said second client application;

(4) matching, by the match maker application, said first plurality of attributes and said second plurality of attributes, to determine at least one common attribute associated with both said first client application and said second client application;

(5) creating a group dataset on said host computer, wherein said group dataset contains said at least one common attribute associated with both said first client application and said second client application; and (6) transmitting, from said host computer, to said second client application, a third message containing said at least one common attribute included in said group dataset, wherein said third message causes said second client application to display a graphical image having a pre-defined, non-textual feature representing the value of said at least one common attribute included in said third message;

wherein the match making application facilitates the execution of an online multi-user, multi-instanced application between the first user and the second user.

* * * * *